Oct. 29, 1968 J. J. WIEGAND 3,407,891
LOAD CELL MOUNTING OF LOAD RECEIVER MEANS AS A SCALE WEIGHBRIDGE
Filed Nov. 25, 1966 4 Sheets-Sheet 2

INVENTOR
JAMES J. WIEGAND
BY
George G. Woodruff
ATTORNEY

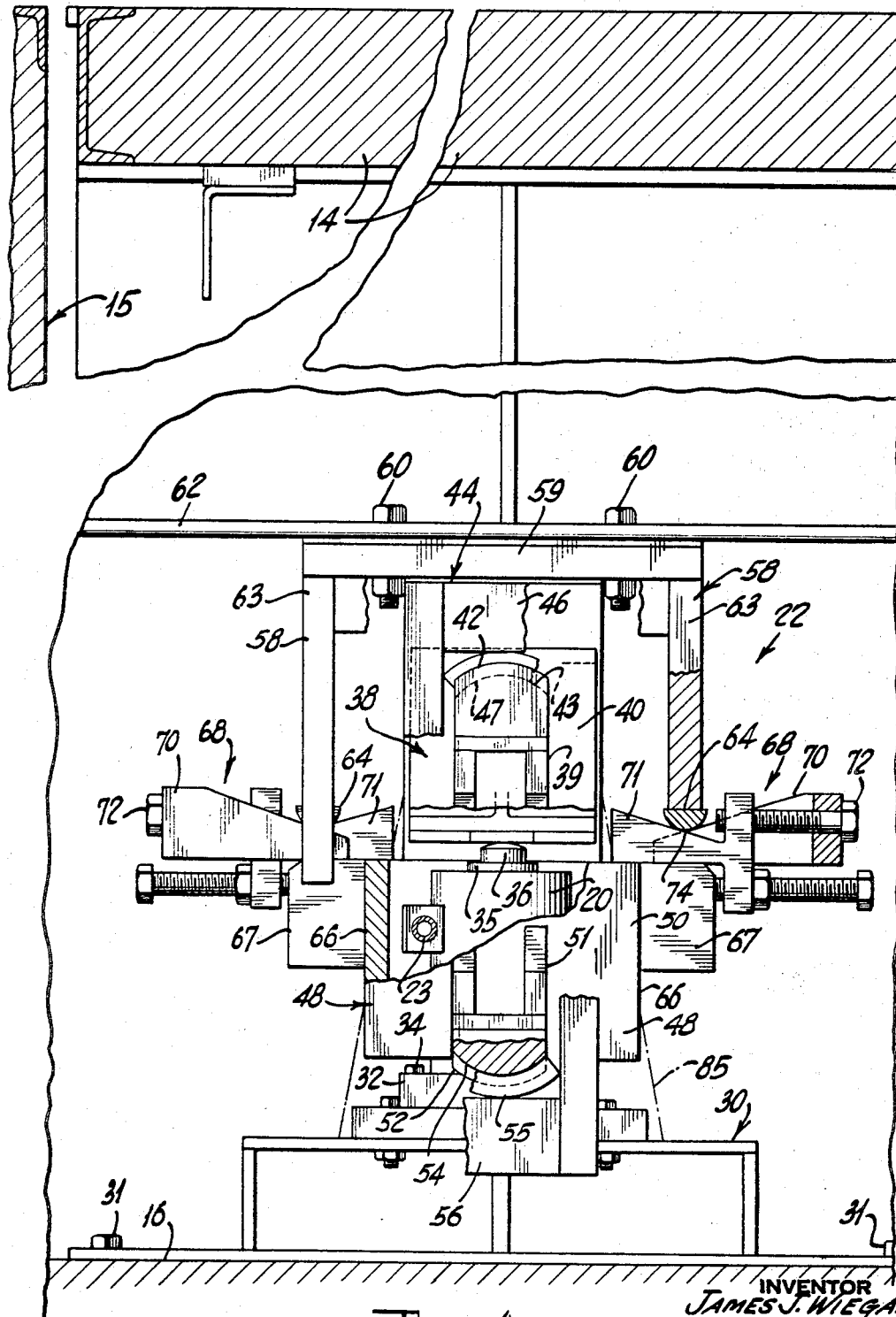

# United States Patent Office 3,407,891
Patented Oct. 29, 1968

3,407,891
LOAD CELL MOUNTING OF LOAD RECEIVER MEANS AS A SCALE WEIGHBRIDGE
James J. Wiegand, Glen Rock, N.J., assignor to Fairbanks Morse Inc., New York, N.Y., a corporation of Delaware
Filed Nov. 25, 1966, Ser. No. 597,076
2 Claims. (Cl. 177—255)

ABSTRACT OF THE DISCLOSURE

Force measuring apparatus having support structure for suspension mounting of a load receiver or weighbridge on the load reaction column of a load cell wherein the longitudinal axis of the load cell column is the load axis of the cell, the support structure providing a force transmitting member seating on the load reaction column of the load cell, and check means effective on the force transmitting member for constraining the latter to force transmission from the load receiver or weighbridge to the load cell column solely in the direction of the cell load axis.

---

This invention relates to force measuring apparatus and more particularly to such apparatus, as a weighing scale for example, having a load receiver for the force to be measured, wherein the receiver is operatively mounted on electrical load cell means producing an electrical output signal proportional to the load under measurement. The invention is concerned more especially with load cell mounting of the load receiver in improved manner such as to overcome difficulties and disadvantages found in apparatus of this kind according to prior practice.

It is well known in connection with electrical load cells of the type having a load reaction column the longitudinal axis of which is the load axis of the cell, that where the force applied to the cell column is not wholly in the direction of the cell load axis, but includes force components at angles to such axis including transverse force components, the cell column reaction is such as to produce an output signal nonproportional to or in error respecting the load being measured. In use of these cells in direct support of a load receiver, as the weighbridge of a scale, the cell column receives force components at angles to its load axis (off-axis force components) created by extraneous and other factors including weighbridge load deflections, lateral displacements of the weighbridge, and thermal expansion and contraction in the weighbridge structure.

Known devices heretofore employed in attempts to compensate for such off-axis force components, include such means as mounting the load cell on a rocker structure, use of slide plates between the cell column and weighbridge or load receiver, constructing the weighbridge to have heavy main girders in order to reduce weighbridge load deflections, and utilizing check members between fixed supports and the weighbridge to restrict lateral movements of the latter. However, arrangements as above indicated have not been entirely satisfactory in avoiding the transmission of off-axis force components to the cell columns, and have introduced expensive constructions particularly where the weighbridge includes heavy main girders to minimize load deflections.

According to the present invention, load cell mounting of a load receiver or scale weighbridge is attained in improved manner which overcomes the deficiencies of prior arrangements, and assures accurate load cell signal output proportional to the loads under measurement. The improved mounting provides a mount structure in association with each load cell, wherein the structure affords relatively movable elements terminating in a force transmitting member in direct seating on the cell load column, and includes means acting directly on the force transmitting member constraining the member to force transmission to the load cell solely in the direction of the cell load axis, and wherein the constraining means effectively absorbs all off-axis force components. The result of the presently improved mounting is the isolation of the load cell column from all off-axis forces, so that its signal producing response is that due only to a force in the direction of the cell load axis, representing the true value of the load under measurement.

Further according to the present invention, the foregoing indicated character of load cell mounting of a load receiver is particularly suitable for, but not limited to, platform or weighbridge type weighing scales, as pit mounted scales, and is such that the weighbridge may be free floating within the confines of the weigh pit, or limited in lateral movements as by simple bumper checks, as desired. Moreover, since the improved mounting provision herein effectively isolates the load cells from force effects consequent to load deflection of the weighbridge, the main girders in the weighbridge structure need not be of heavy section character as heretofore employed to minimize deflection. Much lighter girders may be used, thereby permitting economies in material and costs respecting the weighbridge construction.

The foregoing stated objective and advantages of the present invention, together with additional advantages, will appear from the following description of a preferred embodiment illustrated in the accompanying drawings, wherein:

FIG. 4 is an enlarged side elevational view of the mount structure, as taken from line 4—4 in FIG. 1, again with parts broken away for detail illustration.

Figure 1:
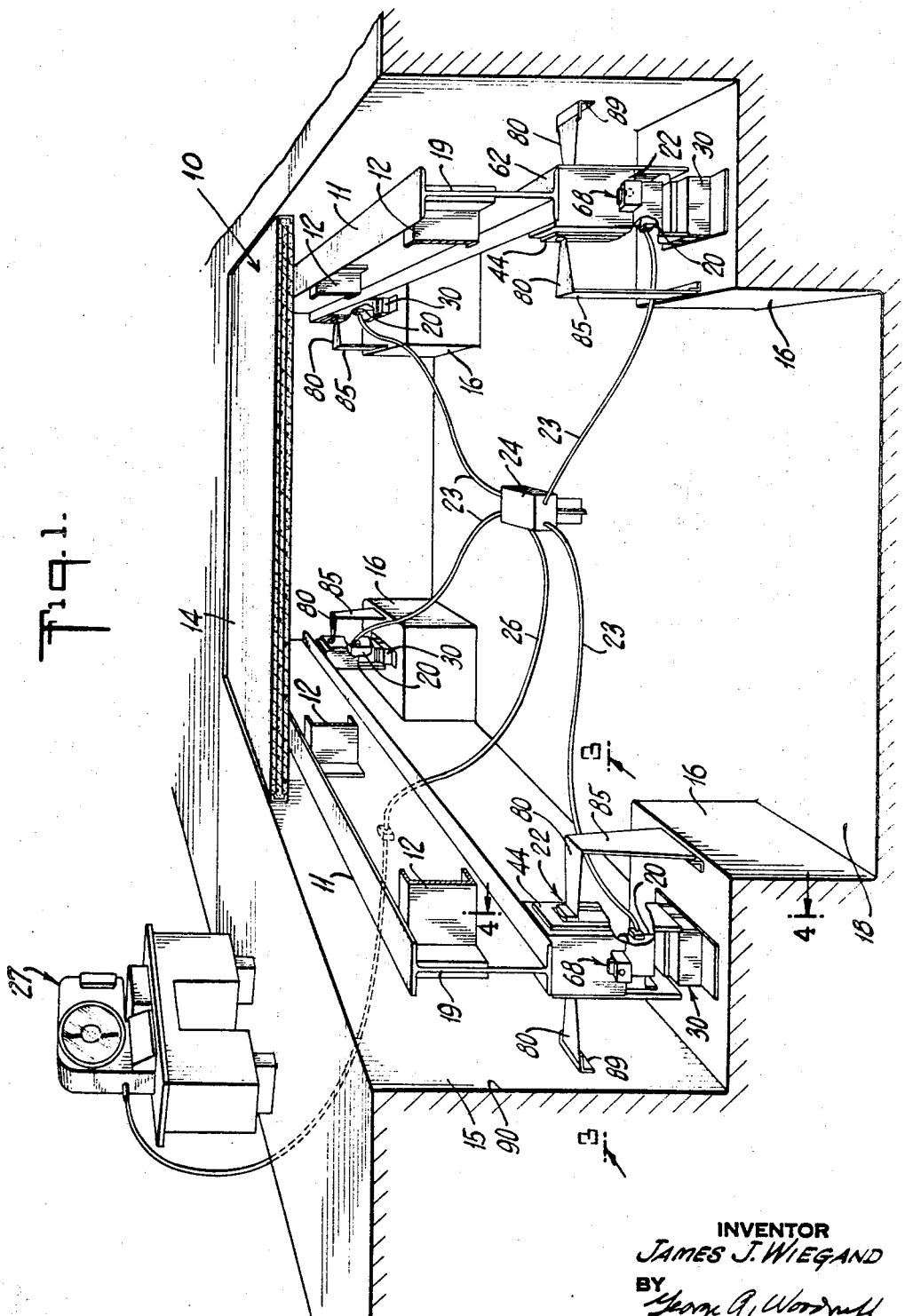
FIG. 1 is a view in perspective of a pit mounted platform weighing scale embodying the presently improved load cell mounting of the weighbridge.

Referring to FIG. 1, the present invention is there illustrated in application by way of example, to the weighbridge 10 of a heavy duty weighing scale, as a pit mounted motor truck scale. Weighbridge 10 comprises a frame structure formed by parallel main girders 11 united by cross members 12, and a load receiving platform 14 shown as of reinforced concrete, carried on the girders. The weighbridge is located in a pit formed by the concrete structure 15, the latter providing piers 16 upstanding from the pit base 18, one below each end portion, as 19, of each girder 11. Mounted in fixed position on each pier 16 in a manner presently to appear, is a load cell 20 which is operatively connected in supporting relation to the associated end 19 of a girder 11 by improved mounting means designated generally at 22 hereinafter to be described in detail. Load cell energizing and signal output connection to each load cell is made by circuit cable 23 between the cell and a junction box 24 centrally in the pit, the junction box having circuit cable 26 leading therefrom to weight indicating and recording equipment indicated at 27.

Figure 2:
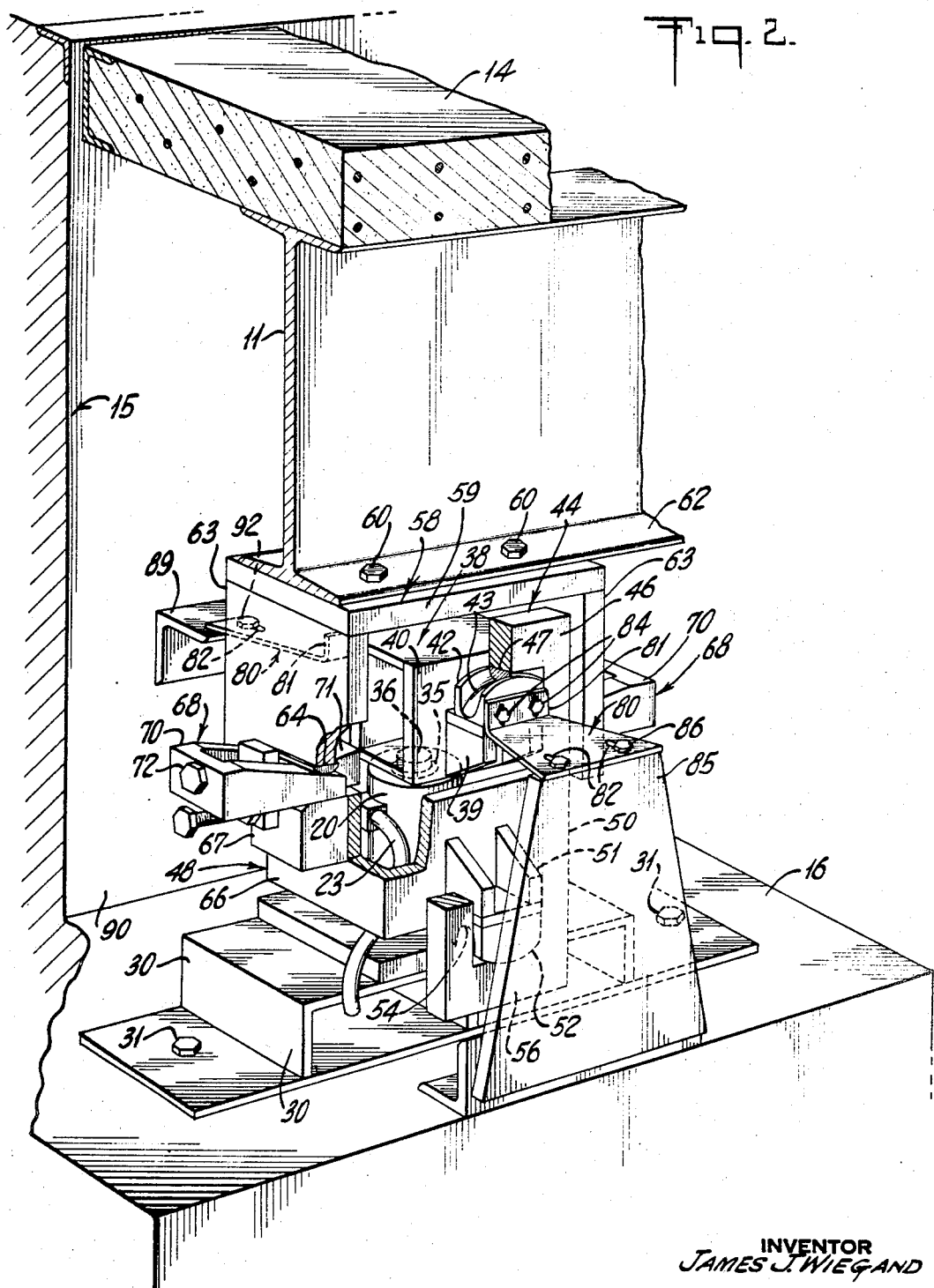
FIG. 2 is an enlarged view in perspective, of the weighbridge-load cell mount as provided at each corner region of the weighbridge wherein parts of the mount structure are broken away for clarity of detail.
Figure 3:
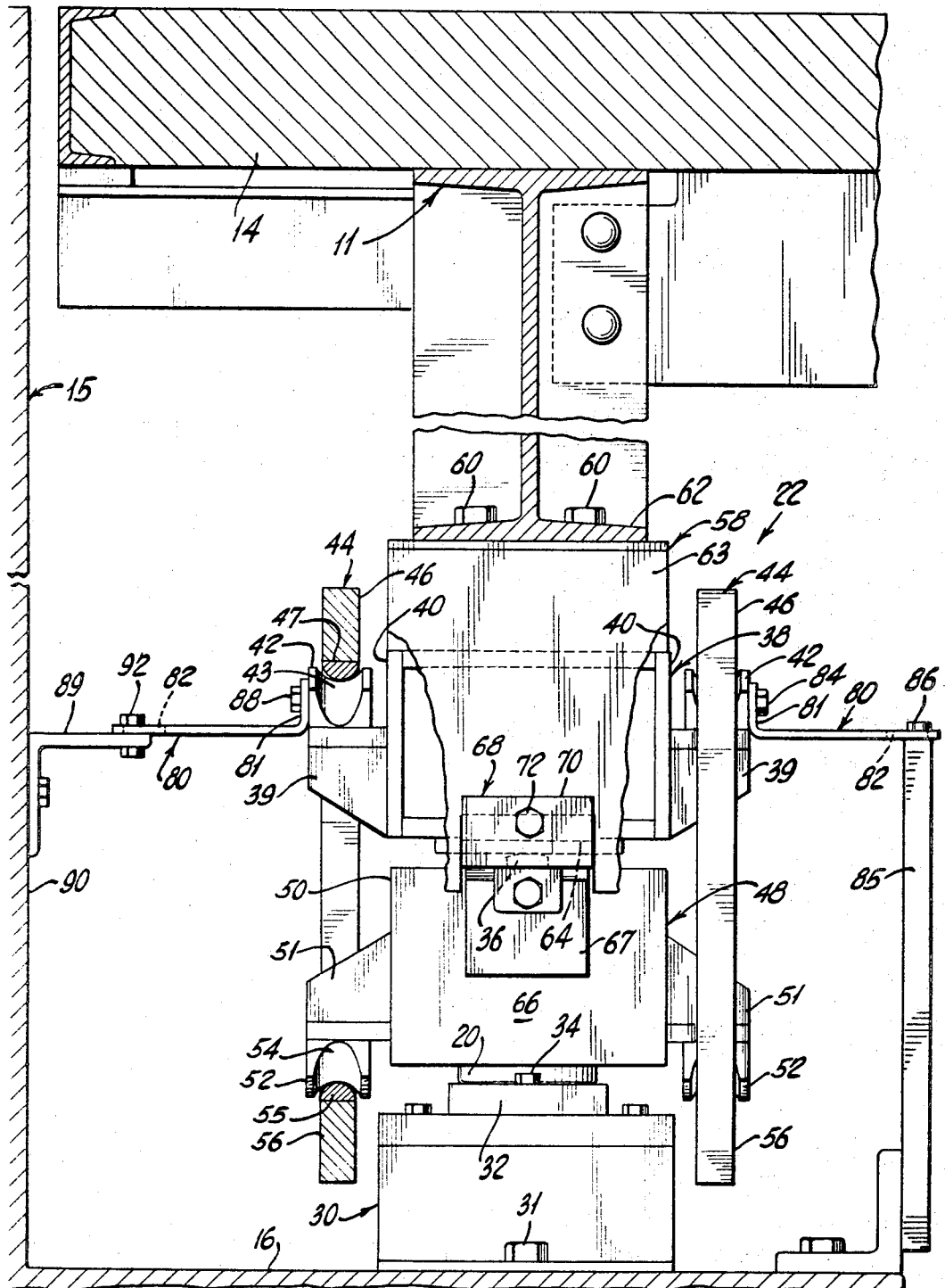
FIG. 3 is an enlarged end elevational view of the improved mount structure, as taken from line 3—3 in FIG. 1, with parts broken away to illustrate detail.

Turning to the improved load cell mounting of the weighbridge, the mount structures 22 between the weighbridge girders and the load cells are identical, so that a description of one will apply equally to each of the others. As shown in FIGS. 2, 3 and 4, seated on the top surface of pier 16 is a rigid base structure 30 which is retained in desired position thereon as by bolting to the pier at 31. Carried on base 30 is a load cell 20, the cell being removably mounted thereon through a cell mounting plate 32 secured to the base by bolts 34. Cell 20 of known and readily available strain-gauge compression type having its load reaction column exposed at 35 and terminating in a load support portion or button 36, is located on base 30 to have its column load axis vertical and such that its button 36 will be in centered relation to and below the associated end 19 of girder 11 in the mounted condition of the weighbridge. In the present example, the girder end 19 is in suspension support on the load cell through suspension linkage now to be described.

Disposed above the load cell is a rigid member or saddle block 38 having a hardened bottom surface area in seating engagement on the cell button 36. Block 38 is formed to provide a rigid extension 39 outwardly from each end 40, each extension providing an upwardly open bearing channel 42 of arcuate extent with its bearing surface 43 concave. Depending from each extension 39 is a rectangular skeleton-form link 44, the upper cross piece 46 of which carries an arcuate bearing element 47 having a rounded bearing surface seating on the concave surface 43 of channel 42. Thus each link in respect to the block extension, is free to pivot and rock thereon.

Below block 38 is a support frame 48 of rectangular or box-like form open at the top and bottom, the frame surrounding the load cell 20 as shown. Carried by the frame at each of its opposite sides 50, is a rigid extension 51 having a bottom-opening arcuate bearing channel 52 presenting a concave bearing surface 54. Engaged in channel 52 on surface 54 is an arcuate rounded bearing element 55 carried by the bottom cross-piece 56 of the associated link 44, the link thereby having freedom for pivotal and rocking movements relative to the associated extension 51. The links 44 thus support frame 48 in suspension from block 38.

The girder end 19 is mounted on frame 48 through a frame member or girder chair 58 of inverted U-shape, having its base 59 secured, as by bolting at 60, to the lower flange 62 of the girder. Each depending leg 63 of the chair is recessed or notched in its lower end, and suitably secured in the recess is a bearing bar 64 having a convex bearing surface. Carried by frame 48 on each of its opposite sides 66 is a rigid block-like extension 67 the upper surface of which provides a seat for a weighbridge elevation adjusting wedge unit 68. Wedge 68 provides cooperating wedge-form elements 70 and 71 in relatively adjustable connection through bolt 72, forming a shallow V-shape bearing region 74 affording a seat for the bearing bar 64 of the associated leg of chair 58. The girder end 19 thus is mounted on the frame 48, so that it is in suspension from the load cell as will be now apparent. By turning the bolt 72 in each wedge unit 68, the wedge elements 70 and 71 may be moved toward or away from each other to vary the vertical distance of the V-shape bearing region above the top surface of the extension 67, and thereby adjust the vertical elevational position of the associated girder end. These wedge units at all of the mount structures thus permit elevational adjustment of the entire weighbridge, as for leveling and disposition of its platform 14 in the horizontal plane of the top surfaces of the concrete pit structure 15.

In the suspension type load cell mounting of the weighbridge as illustrated and described, the suspension links 44 at each mount structure may pivot or swing out of vertical positions consequent to any one or more of the factors hereinbefore referred to, including lateral movements of the weighbridge, thermal expansion or contraction in the girders 11 and load deflections of the girders. Such out-of-vertical movements of the suspension links at each mount tend to impose through the load cell saddle block 38, off-axis forces on the cell load column which if permitted, will result in cell signal output non-proportional to the load under measurement. However, in accordance with the present invention each cell mount structure includes means acting directly on the saddle block in a manner constraining the block to force transmission to the associated load cell solely in the direction of the cell load axis.

Such means at each suspension mount structure, comprises one or more check links, as the pair of check links 80 shown in the present example, connected to saddle block 38. Each check link is a flat or plate-like member formed preferably of steel, having predetermined appreciable length and width so as to be relatively rigid in its longitudinal and transverse directions, and having a predetermined thinness permitting a desired degree of link flexure. One end of each check link is turned to provide a mounting flange 81, while the opposite link end has bolt-receiving slots 82. In assembly, one check link has its flange 81 secured to one of the block extensions 39 as by bolts 84, the link extending horizontally therefrom to a rigid support or stand 85 carried on pier 16. The link is secured to the stand bolts 86 in link slots 82, the slots permitting of longitudinal position adjustment of the link between the saddle block and the stand. The other check link is similarly attached by bolts 88 at its flange 81 to the opposite block extension 39, and extends horizontally to a bracket 89 which in the present example, is mounted on the adjacent pit wall 90. Bolts 92 through the link bolt slots 82, adjustably secure the check link to the bracket.

The check links 80 as so mounted in connection to saddle block 39, thus effectively constrain the latter against any movement horizontally or angularly relative to the cell column button 36, whereby to prevent block transmission of off-axis force components to the cell column. Thus the saddle block loads the cell column only in the load axis direction of the cell, thereby assuring cell signal output in true proportion to the load being measured. It will be appreciated, of course, that through the flexure capability of the check links, the links yield in flexure to accommodate vertical force transmitting displacements of the saddle block. Block displacement at maximum loading amounts to only a very small fraction of an inch, corresponding to the degree of load column compression response to such loading, in a load cell having a capacity adequate to the given installation. Typically in a heavy duty or motor truck scale according to the present example, maximum loading displacement of the block normally will not exceed about .01 inch. Therefore, with such small maximum movement of the block, the thickness of the link in each case may be appreciable to enhance the longitudinal and transverse rigidity of the link, yet of sufficiently small dimension in relation to the effective length of the link, as to permit link flexure (in the direction of the cell load axis) with a negligible minimum of flexure resistance effect on the saddle block. In the heavy duty scale of the present example for instance, it is found that links each having a length to thickness ratio of the order of 20 to 1 are entirely effective for the purpose according to the invention. Moreover, due to the fixed mounting of the check links as on the stand 85 and bracket 89, and the rigidity of each link in its longitudinal and transverse directions, these check links effectively absorb off-axis force components reflected on the saddle block from the weighbridge.

Having illustrated and described a presently preferred form of the invention, it now will be appreciated that through the improved weighbridge-to-load cell mount structure including the check links 80, the load cell column is isolated from all off-axis forces so that the cell responds only to force transmission along the cell load axis. Such is accomplished while permitting of weighbridge lateral movements, thermal expansion and contraction in the weighbridge girders, and load deflections of the girders. Since the effect of girder load deflections on the cells is now eliminated, the girders may be of relatively light construction as compared to the heavy-section girders employed heretofore, thereby permitting desirable economy in girder construction.

What is claimed is:

1. In force measuring apparatus such as a weighing scale, providing a load receiver structure, and electrical load cells each having a load reaction column the longitudinal axis of which is the load axis of the cell, wherein the load cells are arranged in fixed positions relative to the receiver structure for support of the latter, and wherein the load receiver structure is subject to problem factors including load deflections, lateral displacements and theremal expansion and contraction, the improvement therein comprising mounting means between each cell column and the load receiver structure for operatively supporting the latter, the mounting means including a support element fixed to the load receiver structure and a rigid force transmitting member seated on the cell column, and being subject to said problem factors occuring in the load receiver structure, by reaction thereto tending to effect transmission of resulting force components to the cell column through said rigid member in directions other than the direction of the cell load axis, and control means for isolating the cell column from such force components, comprising fixed supports on opposite sides of said rigid member and spaced therefrom, and a check link mounted on each fixed support and extending to connection with said rigid member, each side check link comprising an elongate plate element characterized by rigidity in its longitudinal and transverse directions and having an integral abutment at one end engaging one side of said rigid member, said fixed supports and check links cooperating to absorb said force components and constrain the rigid member to force transmission to the cell column only in the direction of the cell load axis.

2. In force measuring apparatus such as a weighing scale, providing a load receiver structure, and electrical load cells each having a load reaction column the longitudinal axis of which is the load axis of the cell, wherein the load cells are arranged in fixed positions relative to the receiver structure for support of the latter, and wherein the load receiver structure is subject to problem factors including load deflections, lateral displacements and thermal expansion and contraction, the improvement therein comprising mounting means between each cell column and the load receiver structure for operatively supporting the latter, the mounting means including a support element fixed to the load receiver structure and a rigid force transmitting member seated on the cell column, and being subject to said problem factors occurring in the load receiver structure, by reaction thereto tending to effect transmission of resulting force components to the cell column through said rigid member in directions other than the direction of the cell load axis, and control means for isolating the cell column from such force components, comprising fixed supports on opposite sides of said rigid member and spaced therefrom, and a check link mounted on each fixed support and extending to connection with said rigid member, each said check link comprising an elongate plate element having an integral abutment at one end engaging one side of said rigid member and secured thereto, and characterized by rigidity in its longitudinal and transverse directions and by flexure capability in the direction of the cell load axis, said fixed supports and check links cooperating to absorb said force components and constrain the rigid member to force transmission to the cell column only in the direction of the cell load axis.

References Cited
UNITED STATES PATENTS

| 783,667 | 2/1905 | Barclay | 177—134 X |
| 1,302,884 | 5/1919 | Varney | 177—255 |
| 3,123,166 | 3/1964 | Schellentrager | 177—211 |
| 3,321,035 | 5/1967 | Tarpley | 177—255 X |

RICHARD B. WILKINSON, *Primary Examiner.*

G. H. MILLER, JR., *Assistant Examiner.*